United States Patent
Saufhaus

[11] 3,836,016
[45] Sept. 17, 1974

[54] APPARATUS FOR THE TRANSPORT AND INTERMEDIATE STORAGE OF PANEL SUPPORTS

[75] Inventor: Egon Saufhaus, Leutzel-Wiebelsbach, Germany

[73] Assignee: Carl Schenck Maschinenfabrik GmbH, Darmstadt, Germany

[22] Filed: July 23, 1973

[21] Appl. No.: 381,514

[30] Foreign Application Priority Data
July 27, 1972  Germany............................ 2236937

[52] U.S. Cl.................................................. 214/1 B
[51] Int. Cl........................................... B25j 15/04
[58] Field of Search .......... 156/566, 438, 567, 458, 156/568, 584, 571, 598; 198/35, 31 R, 209, 31 AA, 211, 167; 214/1.6, 1.7, 1 B; 221/225, 84, 227, 85, 82, 86, 83; 271/172

[56] References Cited
UNITED STATES PATENTS

| | | | |
|---|---|---|---|
| 1,880,956 | 10/1932 | Farmer | 221/86 |
| 2,318,215 | 5/1943 | Gans | 156/571 |
| 3,001,216 | 9/1961 | Hartzell | 198/35 |
| 3,650,876 | 3/1972 | Stageberg | 156/584 |
| 3,799,322 | 3/1974 | Van Linjer et al. | 198/35 |

*Primary Examiner*—Douglas J. Drummond
*Assistant Examiner*—J. Gallagher
*Attorney, Agent, or Firm*—Wolfgang G. Fasse; Willard W. Roberts

[57] ABSTRACT

A system for the separation of panel supports and panels in the production of panels, provides panel supports having head rods to which flexible sieve like members are affixed for supporting the panels. A tiltable platform releases head rods supported thereby onto a rotatable drum having a plurality of clamping positions. The drum is also provided with a transfer station for releasing the clamping means to transfer the head rods and their respective sieve support members to a transfer belt. Control means are provided, whereby panel supports received at the platform are immediately transferred to the drum, and the panel supports are stored on the drum until called for in the manufacturing process, whereupon they are transferred from the drum at the transfer station.

10 Claims, 3 Drawing Figures

3,836,016

APPARATUS FOR THE TRANSPORT AND INTERMEDIATE STORAGE OF PANEL SUPPORTS

BACKGROUND OF THE INVENTION

The invention relates to the production of paneling, especially wood chip or fiber paneling. More specifically, the present apparatus is useful in connection with paneling production lines employing flexible apertured, for example, sieve like supports for the individual panels. In the manufacturing process these supports are moved through a spreading station, wherein a layer of chips or fibers is applied to each individual support. The supports with the chip or fiber layers thereon are then moved to a press where the layer is compacted into a panel. Thereafter, the supports must be separated from the panels. This is accomplished in a separating station. Thereafter, the supports are again moved through the spreading stations for receiving a new layer of chips or fibers.

U.S. Pat. No. 3,542,629 discloses a separating station wherein the panel supports are moved downwardly by means of a deviating or reversing conveyor, whereas the panel itself continues its travel in a horizontal direction. The reversing or deviating conveyor supplies the panel supports to a multitier storage which stores the supports and releases them to a conveyor as the supports are needed. The conveyor then transports the supports in the direction toward the spreader station.

The use of a storage in which the panel supports are maintained in a rest position involves a relatively large amount of time for the insertion and withdrawal of the supports into the storage. As a result, there is very little time available for the moving of the panel supports, especially for transferring the supports from the storage to the conveyor which receives the supports from the storage due to the operational speed of the entire production line, since the speed is predetermined by controlled timing. Therefore, it was necessary to store and remove the supports at high speed. This results in considerable wear and tear of the entire transport equipment, and has been a source of trouble when the entire production line was operated at desired high production speeds.

OBJECTS OF THE INVENTION

In view of the foregoing, it is the aim of the invention to achieve the following objects singly or in combination:

to provide a production line for the manufacture of panels, especially fiber chip panels with a transport and intermediate storage device capable of operating at short time intervals for thus increasing the operational speed of the entire production line;

to provide an intermediate storage and transport apparatus for supports of panels, especially fibers and/or chip panels from which the supports may be quickly and easily retrieved;

to assure high production speeds while simultaneously reducing or keeping within reasonable limits the wear and tear of the supports themself as well as of the transport devices; and to provide an apparatus for separating panels from panel supports and for storing the thus separated panel supports in a continuously moving storage device, whereby removal of the panels from the storage device may be rapidly effected with a minimum of wear on the apparatus.

SUMMARY OF THE INVENTION

According to the invention an apparatus is provided for the transport and intermediate storage of panel supports. The supports are provided with a head rod and are generally flexible. The supports are separated from the panels in a separating station in the apparatus in order to be transported downwardly to a transfer station. In the transfer station the supports are transferred to a conveyor which transports the supports to a spreading station for the formation of a layer of fibers or chips on the supports. An intermediate storage for the supports is provided between the separating station and the transfer station, wherein the flexible panel supports are secured with their head rods to the circumference of a rotatable drum. The drum cooperates with pressure applying means which move in synchronism with the drum, whereby these pressure applying means press the panel supports against the drum surface in the area between the separating station and the transfer station. Further means are provided for releasing the head rods from the circumference of the drum and for depositing the supports on the transfer conveyor for transport to a spreading station.

According to a further feature of the invention a plurality of receiving positions are provided along the circumference of the drum, whereby each receiving position comprises a holding device for the head rod and each receiving position is adapted to receive one panel support. Each receiving position also comprises a switch connected to a common control device and indicating that the respective position has received a panel support. Thus, the control apparatus is provided with information showing which receiving position corresponding to the storage position have received a panel. The control apparatus controls the rotation of the drum so that the next empty storage or receiving position, as viewed in the direction of drum rotation is moved to the separating station, and that the rotational speed is briefly reduced for transferring a panel support onto the drum. Between the actual transfer of the support onto the drum the latter may rotate at high speed without subjecting the panel supports to high wear and tear. Thus, only at the time of receiving a support in the separating station, will the drum speed be reduced to the speed of the oncoming support.

According to a preferred embodiment of the invention, the pressing devices which press the support onto the surface of the drum are provided in the form of so called belt conveyors, one run of which is in contact with the surface of the drum or rather with the panel supports held on the surface of the drum and the other run of which is guided over rollers arranged with a radial spacing relative to the drum. This feature assures a uniform and gentle pressing of the supports onto the drum surface by simple means. Suitably two such belt conveyors are provided one of which extends approximately from the separating station to the transfer station adjacent to the transfer conveyor and the other stretches from the transfer station to the separating station. Thus, approximately the entire circumference of the drum is covered by the pressure belt conveyors, whereby the supports stored on the drum are securely held in their respective storage positions during the entire drum rotation. Since the separating station is arranged at the upper reach of the drum where the supports rest on the drum surface under the influence of gravity, it is not necessary to provide pressure means in this area. At the point of transfer of the supports onto the transfer conveyor, the spacing between the two pressure belt conveyors may be made small so that those supports which remain on the drum, that is those which are not being transferred onto the transfer conveyor, will not change their position on the drum surface.

According to a still further embodiment of the invention a free wheeling device is provided by means of which the transfer conveyor is connected with a separate drive means. A switching clutch is provided for connecting the transfer conveyor with the drum drive during the transfer of a panel support. The transfer conveyor may thus be synchronized with the drum drive only during the transfer of a support. During the remaining time the transfer conveyor may be driven with a speed which may be adapted, for example, to the further following transport means in the panel production apparatus.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
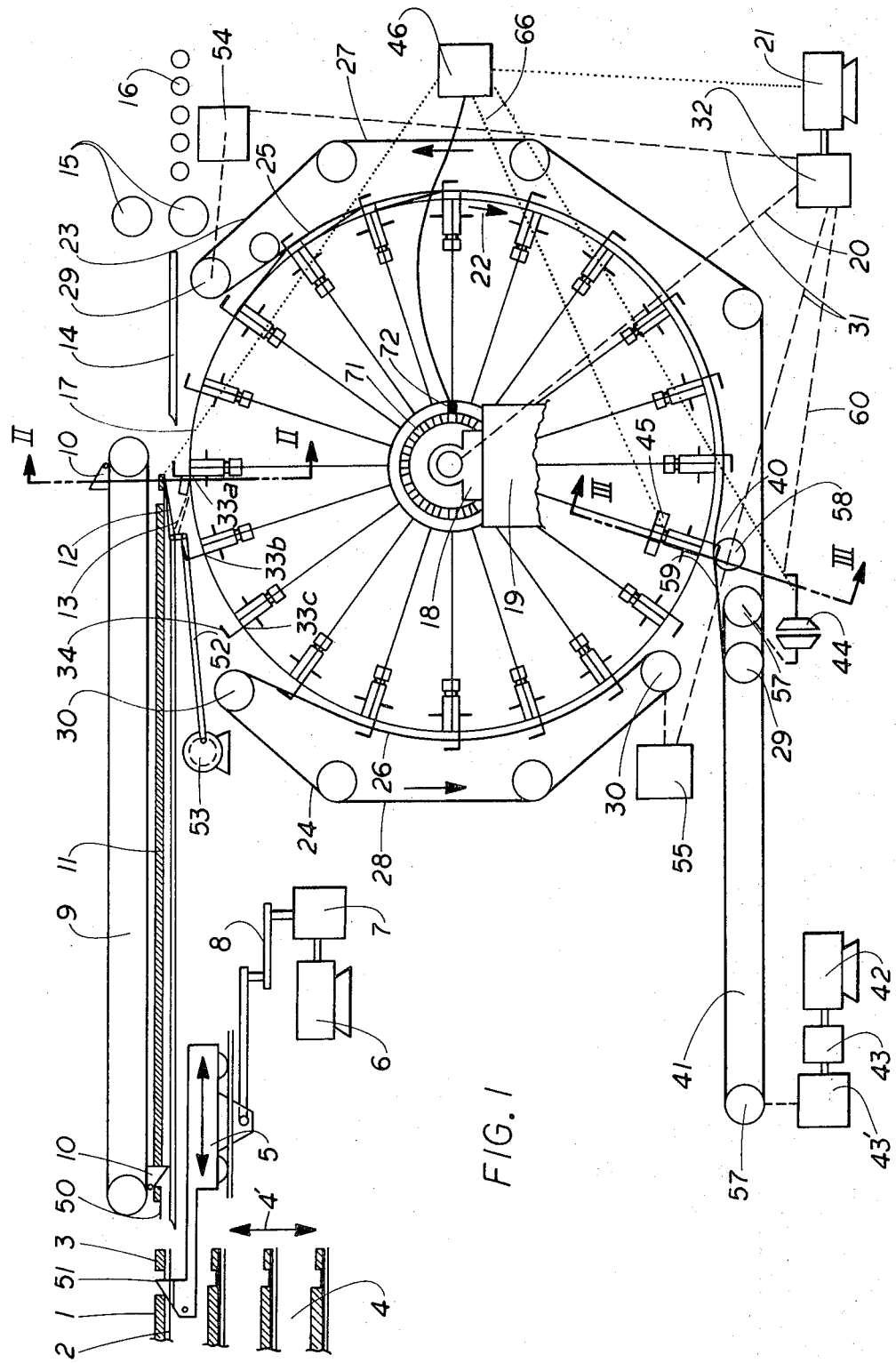
FIG. 1 is a side view of a transport and intermediate storage device for the panel supports in a panel production line, such as a chip or fiber panel production line in accordance with the invention.
Figure 3:
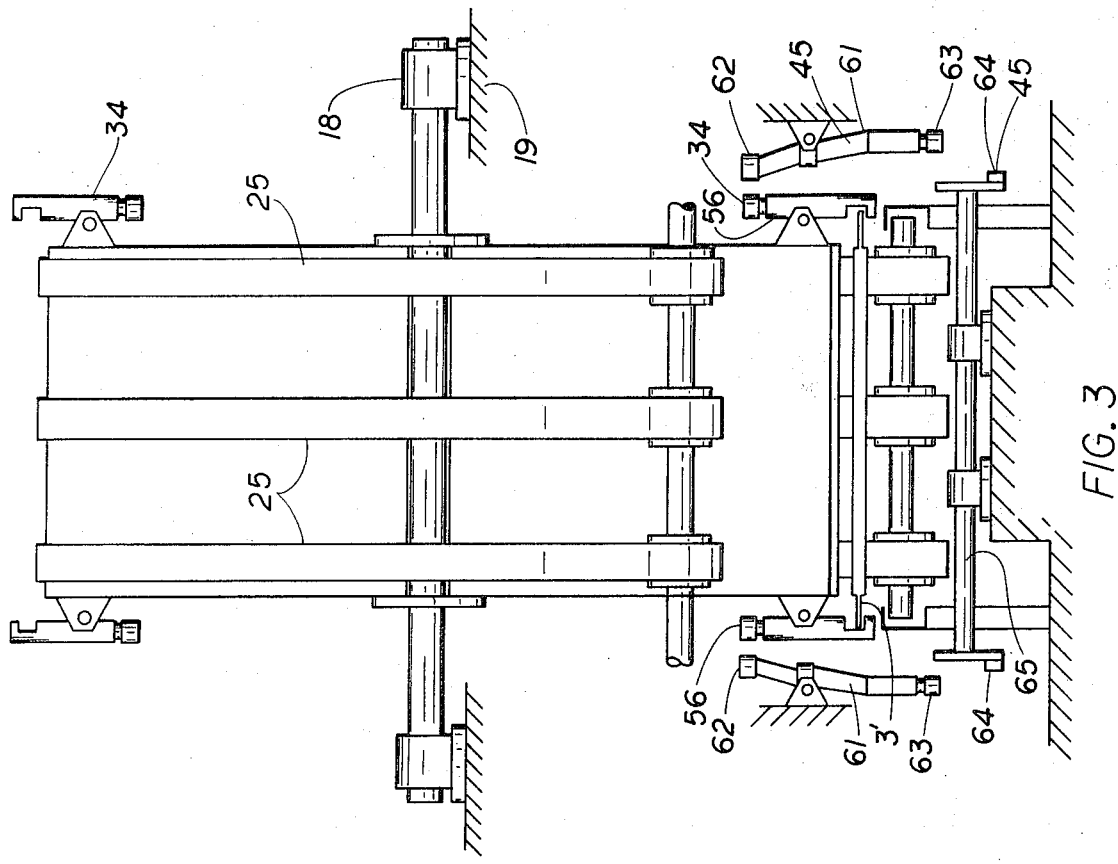
FIG. 3 is an enlarged sectional view of another portion of the arrangement of FIG. 1 taken along section line III—III in FIG. 1.
Figure 2:
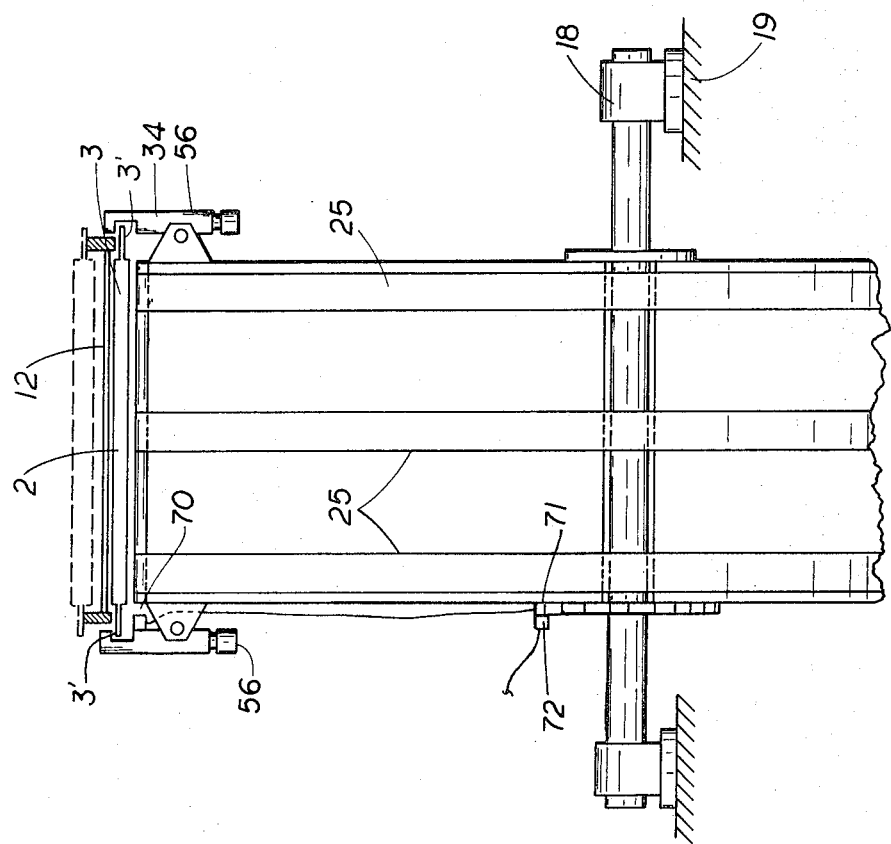
FIG. 2 is an enlarged sectional view of a portion of the arrangement of FIG. 1 taken along the line II—II in FIG. 1.

FIG. 1 illustrates the output end of a production line for the manufacture of panels, especially fiber board or chip panels or so called pressboards. The pressed panels 1 are carried by sieve type supports 2. The pressed panels 1 are of any conventional size fabricated by conventional means. The sieve type supports 2 may be comprised of a head rod 3 to which a flexible sieve or screen 50 is attached. The screen 50 of each support 2 is of generally the same size as the panel 1 carried thereby, the head rod being affixed by conventional means to the leading edge thereof and having side extensions 3' extending beyond the side edges of the panels 1 and sieve 50 (as seen in FIGS. 2 and 3). The supports with the panels thereon are located in the discharge basket 4 only schematically illustrated. Said basket 4 is a part of a conventional panel press (not shown). The basket 4 is adapted to move panel supports and the pressed panels 1 carried thereby into position for feeding to the transport mechanism of the invention, as illustrated by the arrow 4'. A withdrawal carriage 5 driven by a motor 6 through a gear box 7 and a crank drive 8 of conventional construction moves back and forth into the discharge basket 4 in order to engage a loaded support 2 for transport at the time when the crank drive 8 is in its dead center position. Specifically, the withdrawal carriage 5 comprises a pair of upwardly extending projections 51 laterally spaced to engage the extensions 3' of the head rod to urge the head rod forward (toward the right in FIG. 1) for loading onto the table 11, the rearward edges of the projections 51 being slanted to permit them to pass under the extensions 3' of the next panel support or screen, in the rearward direction of movement of the carriage 5. A chain conveyor 9 is provided above the table 11, the conveyor 9 extending parallel to the table and having one or more sets of cams 10 laterally spaced apart to engage the extensions 3' of the head rod 3 of the supports 2, in order to withdraw the support 2 and the panel carried thereby from the discharge carrier 5. The chain conveyor 9 thus effects the withdrawal of the discharge carriers 5 without any interruption in the forward movement of the support 2.

The support 2 is thus drawn along the table 11 to the separating station 12. The separation station comprises a depositing structure for the sieve supports 2. This depositing structure comprises substantially a tiltable platform 13. For example, the platform 13 may be an extension on the forward end of the table 11, the extension 13 being pivoted at the end of the table, and controlled by suitable crank levers, such as lever 52 moved in a conventional manner by a motor 53. The platform 13 is thereby periodically tilted downwardly. Since the sieve 50 attached to the head rod 3 is flexible, the head rod thereby moves downwardly with the platform 13. When the head rod 3 thus moves downwardly, it is moved out of engagement with the cams 10, the cams thereby continuing to be moved along the withdrawal conveyor 9.

The further forward movement of the support 2 to be described in more detail below, causes the advance of the panel 1 onto a horizontal table 14, since the panel is relatively rigid, whereby the panel 1 is separated from the support 2. The panel is then advanced by means of two rollers 15 at least one of which is driven to move the panel onto a roller bed 16, from which it may be transported for further processing. For example, the rollers 15 may be conventionally driven in a continuous manner or in synchronism with the drive of a drum 17.

Below the separating station 12 there is arranged a large drum 17, the bearings 18 of which are supported for example on a concrete pedestal 19. The drum 17 is driven by the motor 21 for example by way of the gear box 32 and a chain drive 20 (indicated by a dashed line) coupled to the gear box 32. The speed of the motor 21 is variable, as will be explained in greater detail in the following paragraphs, so that the speed of rotation of the drum 17 is also variable. The direction of rotation is indicated by the arrow 22.

Presser belt conveyors 23 and 24 are arranged for cooperation with the drum 17. One run 25 of the conveyor 23 is positioned to contact the surface of the drum between the separating station 12 and a transfer station 40, and one run 26 of the conveyor 24 is positioned to contact the surface of the drum in the region thereof following the transfer station 40. The conveyor 23 extends between suitable rollers 29, with intermediate rollers being provided as necessary, and the conveyor 24 extends between rollers 30 with suitable intermediate rollers being provided if necessary. The return runs of the belts are, of course, radially spaced from the drum by means of rollers as illustrated. The belt conveyor 23 may be driven from one of the rollers 29 by the motor 21, for example by way of gear boxes 32 and 54, and the belt conveyor 24 may also be driven by the motor 21, for example by way of gear boxes 32 and 55, shafts 31 indicating the mechanical coupling between the gear box 32 and the gear boxes 54 and 55. The belt conveyors 23 and 24 are thus driven in synchronism with the drum in such a manner that the circumferential speed of the drum 17 and of the belt conveyors 23 and 24 is the same. As illustrated in FIGS. 2 and 3, the belt conveyors 23 (and also 24, not shown) may be comprised of a plurality of spaced apart belts.

A plurality of storage positions, for example, twenty storage positions such as positions 33a, 33b, 33c and so forth are arranged about the circumference of the drum 17. Each storage position comprises a holding means 34 for the head rod 3 of a support 2. The holding device 34 at each position comprises substantially two hook-like catch members one of which is arranged at each end of the drum. These catch members are movable and engage the ends 3' of the head rod 3 as shown in FIG. 2. For example, as illustrated in FIGS. 2 and 3, the holding devices 34 at each position may be comprised of levers 56 suitably pivoted to the opposite ends of the drum for rotation about axes generally tangential with respect to the drum. The levers 56 have hook-like ends to engage the ends 3' of the rods 3. Means (not shown) such as springs may be provided for biasing the levers 56 into engagement with the rod ends 3'. As illustrated in FIG. 1, from the side view the members 34 are also hook shaped, with the hooks extending in the direction of travel of the drum, so that the rod ends 3' may be carried with the drum upon rotation thereof in the direction of the arrow. It will be understood, of course, that any suitable releasable holding device may be employed for the catch members 34. The number of the storage positions may be selected substantially at random and its upper limit is only given by the length of the circumference of the drum 17. The transfer station or position is arranged at a lower position of the drum 17 between the presser conveyors 23 and 24. The supports 2 are transferred in this station from the surface of the drum 17 to the transfer conveyor 41. The transfer conveyor 41 extends between rollers 57 positioned so that there is a partial overlap between the belt 41 and the belt 23. Thus, the belt 41 may be comprised of a plurality of spaced apart belts which are also spaced apart with respect to the belts of the conveyor 23. In order to provide the overlap, the lower roller 29 for the conveyor 23 is spaced from the drum 17, and a roller 58 is provided for urging the belt 23 against the drum 17 adjacent the lower roller 29. Consequently, a generally horizontally extending portion 59 is positioned so that it may convey rods 3 from the drum 17 to the belt 41. The belt 41 transfers supports 2 to a spreading station arranged at the input end of the production line (not shown). Preferably, a further conveyor is arranged in this transfer path from the station 40 to the spreading station. The transfer conveyor 41 is driven by a motor 42 through a free wheeling device 43 which acts as a take-over clutch and a gear box 43'. Further, a driving connection is provided between the transfer conveyor 41 and the motor 21 by way of gear box 32, shaft 60, and a shift clutch 44 coupled to one of the rollers 57. Thus, when a rod being transferred to the belt 41 from the drum 17 is carried by the portion 59 of the belt 23 to the point at which it is transferred to the belt 41, the clutch 44 is closed to synchronize the speed of the belt 41 with the speed of the belt 23, thereby overriding the motive power applied to the belt 41 by way of the motor 42 due to the use of the free wheeling clutch 43. The belt 41 may thus be provided with a normal speed under the control of the motor 42 for the purposes of later transfer, but be readily provided with a speed synchronized with the rotation of the drum for transfer of the support 2 from the drum, by means of the use of the free wheeling device 43 and clutch 44.

A control cam device 45 is provided in the transfer station 40, the device 45 being tiltable in order to move the catch member 34 to release the head rod 3 as shown in FIG. 3. For example, the control cam device 45 may be comprised of a pair of levers 61 having fixed pivots, with first ends 62 positioned to engage the levers 34, and second ends 63 positioned to be moved by cam surfaces 64 on a rotatable member 65. Thus, when the member 65 is rotated to effect engagement between the cam surfaces 64 and the ends 63 of lever 61, the ends 62 of the lever 61 urge the levers 56 out of engagement with the ends of the rods 3, thereby permitting the rods, and hence the sieves attached thereto, to drop onto the portion 59 of the belt 23 for transfer by way of the belt 41. The rotatable member 65 is controlled by any conventional means, for example, the coupling indicated by line 66, to rotate under the control of the control device 46.

The support 2 is deposited in the separating station 12 without stopping of the withdrawal conveyor 9, which continues its movement into a stop position above the withdrawal carriage 5. The stopping of the conveyor 9 is controlled by the control device 46 by conventional means (not shown). The storage position 33a now advances the support 2 with the aid of the catch members 34. At this time, preferably slightly prior thereto, the support 2 has been lowered into the transfer position by means of the platform 13. The drum 17 which is, for example, rotated with a circumferential speed of about 90 meters per minute, is temporarily slowed down at the time of taking over a support to a circumferential speed of about 20 to 25 meters per minute under the control of the control device 46. Thereafter the drum is accelerated again to its higher speed, said higher speed being essentially selected with reference to the timing control of the entire panel production line.

The catch members 34 retain the head rod 3 close to the drum 17 and the sieves are held against the drum by the belts 23 and 24. Shortly following the separating station 12 the supports 2 on the drum 17 move into the space between the drum surface and the run 25 of the presser conveyor 23 which may, for example, comprise three belts arranged alongside each other and distributed over the length of the drum 17. The presser conveyor 23 may be comprised of three similar belts. These belts prevent displacement of the supports 2 during the further rotational movement of the drum 17.

When a support 2 reaches the discharge position in the transfer station 40 and when the control of the apparatus, by means of the control device 46 calls for the transfer of a support 2, the cam devices 45 arranged at the ends of the drum 17 release the catch member 34 which thereby tilts outwardly to in turn release the head rod 3. The head rod 3 moves onto the run 25 of the belt conveyor 23 horizontally away from the drum surface on the portion 59 of this belt and thus onto the transfer conveyor 41. At this time, as above stated, the belt 41 runs synchronously with the presser conveyors 23 due to the closing of the clutch 44. Consequently, the free wheeling device 43 disengages the drive of the belt 41 by the motor 42. As soon as the entire length of the support 2 has moved out of the storage, the clutch 44 is released under control of the control device 46 and the support 2 is then conveyed by the belt 41 with the speed of the transfer conveyor as determined by the motor 42.

Each storage position 33a, 33b and so forth of the drum 17 comprises an end position switch, such as the switch 70 shown in FIG. 2 connected through commutators 71 and brushes 72 to the central control device 46. The end position switches supply information whether the respective storage position is filled or empty. A 20 step timer of conventional design in the control device 46 indicates the locations of the storage positions. The storing takes place in the sequence of the storage positions 33a, 33b, 33c and so forth whereas the removal of the supports from the storage positions takes place in the opposite sequence that is the operation takes place on a last-in first-out basis. The sieves of the supports 2 stored on the drum 17 overlap each other as is illustrated in FIG. 1 on the right hand side of the drum 17.

While the central control device 46 is shown only schematically in FIG. 1, it will be appreciated that the control device 46 constitutes only a portion of the overall control arrangement comprising a plurality of interconnected elements for the control of the entire production line. The control device 46 controls the motion of the drum 17 in such a manner that any support 2 transferred to the separation station 12 is instantaneously received in the storage drum and that a discharge of the support at the transfer station 40 takes place only when the respective support is called up, for example, automatically or manually, for receiving a spread or layer of fibers or chips in the spreading station. The drum 17 thus provides not only the transport of the support 2 from the separation station 12 to the transfer station 40, but it also provides the storage of the support members. The control circuit may be thus designed to perform these functions according to conventional well known techniques.

In the apparatus according to the invention, as above described, it is thus apparent that the downward transport and the storage of the panel supports takes place simultaneously, that is, the stopping of the supports and the insertion into a stationary storage has been obviated. This substantially reduces any dead times so that the transfer and the transport of the support may be accomplished in ample time. The bending stress of the supports is small because the bending radius is determined by the dimensions of the drum, the diameter of which extends from the separating station to the transfer station. Due to the fixing of the head rod of the support and due to pressing the supports against the drum surface, the supports are transported in a gentle manner while, nevertheless, they are safely maintained in their predetermined position on the surface of the drum until they are being transferred onto the transfer conveyor. The common drive motor 21 synchronously drives the drum, the pressure applying devices and at least also the transfer conveyor during the time when the supports are actually transferred onto the transfer conveyor. By this synchronous drive an especially gentle handling of the supports is assured.

Although the invention has been described with reference to specific example embodiments, it is to be understood, that it is intended to cover all modifications and equivalents within the scope of the appended claims.

What is claimed is:

1. In a production system for the manufacture of panels in which the panels are supported during a portion of the manufacturing process on flexible panel supports having head rods, and wherein the system includes a station for separating the panels from the panel supports, an intermediate station for storage of the supports, and a transfer station for transferring supports to a conveyor for reuse in the fabrication of panels; the improvement wherein said intermediate station comprises a rotatable drum, means for rotating said drum, and means releasably latching head rods on the circumference of said drum, whereby the flexible supports of head rods latched to the drum extend around the circumference of the drum, said separating station comprises means for loading flexible supports on said drum with the head rods thereof latched by said latching means, said transfer station comprises means spaced around the circumference of said drum from said separating station for releasing head rods from said latching means for transfer of the respective panel supports by said conveyor, and wherein said intermediate station further comprises pressure device means synchronously driven with said drum for pressing said supports against said drum between said separation and transfer stations.

2. The system of claim 1, wherein said means for rotating said drum comprises common drive means for synchronously driving said drum, said pressure device means and said conveyor, whereby said conveyor is driven synchronously with said drum at least during the transfer of supports from said drum onto said conveyor.

3. The system of claim 1, wherein said drum has a plurality of receiving positions spaced around the circumference thereof, said latching means comprising catch means at each of said position for releasably latching head rods to said drum, and further comprising switch means at each of said receiving positions and responsive to the presence of a head rod at the respective position, and further comprising common control means connected to said switch means for receiving data from said switch means corresponding to the positions of head rods loaded on said drum.

4. The system of claim 3, wherein said control means is connected to control said drum rotating means for rotating said drum to position empty positions on said drum in alignment with said separating station, said control means further comprising means for reducing the rotational speed of said drum for receiving supports at said separating station.

5. The system of claim 1, wherein said pressure device means comprises belt conveyors having runs positioned to contact supports carried on the surface of said drum and return runs and further comprising roller means for radially spacing said return runs from said drum.

6. The system of claim 5, wherein said belt conveyor means comprises first and second belt conveyors, said first belt conveyor extending from said separating station to said transfer station in the direction of rotation of said drum, and said second belt conveyor extending from said transfer station to said separating station in the direction of rotation of said drum.

7. The system of claim 2, further comprising separate drive means for said conveyor, said separate drive means comprising free wheeling means, said system further comprising switching clutch means for interconnecting said conveyor with said common drive during the transfer of said supports from said drum to said conveyor.

8. A separating, transfer and storage apparatus for panel supports of a panel manufacturing station, wherein the panel supports are comprised of head rods and flexible panel support means; said apparatus comprising a rotatable drum, latch means spaced along the periphery of said drum for releasably holding head rods on said drum, means for directing panel supports to said drum for latching of the respective head rods to said drum, conveyor means, means spaced from said support directing means for releasing support means on said drum onto said conveyor means, and means for pressing panel supports loaded on said drum against the circumference of said drum.

9. The apparatus of claim 8, wherein said pressing means comprises belt means for urging said supports against the circumference of said drum, and common drive means for synchronously driving said belt means and said drum.

10. The apparatus of claim 8, wherein said means for directing panel supports to said drum comprises table means, means for drawing support means with panels loaded thereon along said table means, and tiltable platform means on said table means positioned to permit head rods of panel supports to be lowered into engagement with said latch means.

\* \* \* \* \*